United States Patent

Newell

[15] 3,667,300
[45] June 6, 1972

[54] ACCELEROMETER MONITORING DEVICE

[72] Inventor: Douglas F. Newell, Bowie, Md.
[73] Assignee: The United States of America as represented by the Secretary of the Navy
[22] Filed: June 1, 1970
[21] Appl. No.: 42,218

[52] U.S. Cl. ..............................73/517, 331/65, 331/117 R
[51] Int. Cl. .......................................................G01p 15/08
[58] Field of Search................73/516, 517; 310/8.4; 331/65, 331/117 R

[56] References Cited

UNITED STATES PATENTS

| | | | |
|---|---|---|---|
| 3,201,984 | 8/1965 | Hinnah et al. | 73/517 X |
| 3,069,623 | 12/1962 | Murgio | 73/517 X |
| 3,390,286 | 6/1968 | Grapin et al. | 73/517 X |
| 3,109,310 | 11/1963 | Slater | 73/516 |
| 3,452,200 | 6/1969 | Matthews et al. | 73/517 X |
| 3,470,747 | 10/1969 | Rasmussen | 73/517 |

Primary Examiner—James J. Gill
Attorney—R. S. Sciascia and J. A. Cooke

[57] ABSTRACT

An acceleration monitoring device for an ordnance vehicle having a piezoelectric transducer for sensing acceleration and for providing a signal responsive thereto. The acceleration responsive signal frequency modulates an oscillator connected, via a field-effect transistor, to the piezoelectric transducer to provide an output signal which is transmitted by an antenna to a location remote from the ordnance vehicle. The field-effect transistor directly couples the piezoelectric transducer to the frequency modulated oscillator and, therefore, provides both a transient and a quiescent acceleration response. A Class C buffer amplifier is coupled to the frequency modulated oscillator and the antenna to isolate the oscillator from the adverse effect of detuning which occurs as the ordnance vehicle approaches a target or the like.

4 Claims, 2 Drawing Figures

INVENTOR
Douglas F. Newell

ACCELEROMETER MONITORING DEVICE

BACKGROUND OF THE INVENTION

This invention relates generally to accelerometers and, more particularly, to a high velocity accelerometer monitoring device.

Prior art accelerometers have been devised to measure acceleration or the like at relatively low velocities. These systems utilize piezoelectric transducers to produce a voltage signal proportional to acceleration for frequency modulating a transmittable radio signal or the like which transmits the sensed acceleration data to a remotely located receiver. Unfortunately, these heretofore employed monitoring devices have been somewhat unsatisfactory when operated at a relatively high velocity. More particularly, if the accelerometer monitoring device is located in an ordnance vehicle or the like travelling at the relatively high velocity of free-fall towards a target, the monitoring device is unable to provide accurate acceleration data to the remotely located receiver prior to or immediately after target impact. This is due, in part, to severe detuning effects which occur immediately prior to target impact which tend to mask the desired acceleration signal produced during target impact. Furthermore, heretofore employed conventional accelerometer monitoring devices have been unable to provide a measurement of dc or quiescent acceleration but have only responded to transient acceleration. Thus, if the output of the accelerometer is a "step function" or the like, prior art acceleration monitoring devices have sensed only the initial rising or falling edge of the step function, corresponding to transient acceleration, but have been unable to sense the "flat" portion of the step occurring after the initial rise or fall, corresponding to quiescent or dc acceleration.

SUMMARY OF THE INVENTION

Accordingly, one object of the invention is to provide an improved accelerometer monitoring device.

Another object of the instant invention is to provide an accelerometer monitoring device accurately operable at relatively high velocities.

A further object of the present invention is to provide an accelerometer monitoring device which is not detuned by target proximity.

Another object of the present invention is to provide an accelerometer monitoring device which provides a dc or quiescent as well as a transient acceleration indication.

Briefly, these other objects of the present invention are attained by directly applying an electrical signal produced by an acceleration responsive device through an impedance coupler to a r.f. signal generating device for varying the frequency of the generated signal. The generated signal is applied to a signal radiating device through a buffer device to minimize the effects of detuning. The generated signal is responsive to both the quiescent and the transient electrical signal produced by the acceleration responsive device.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawing wherein.

DESCRIPTION OF THE PREFERRED EMBODIMENT

Figure 1:
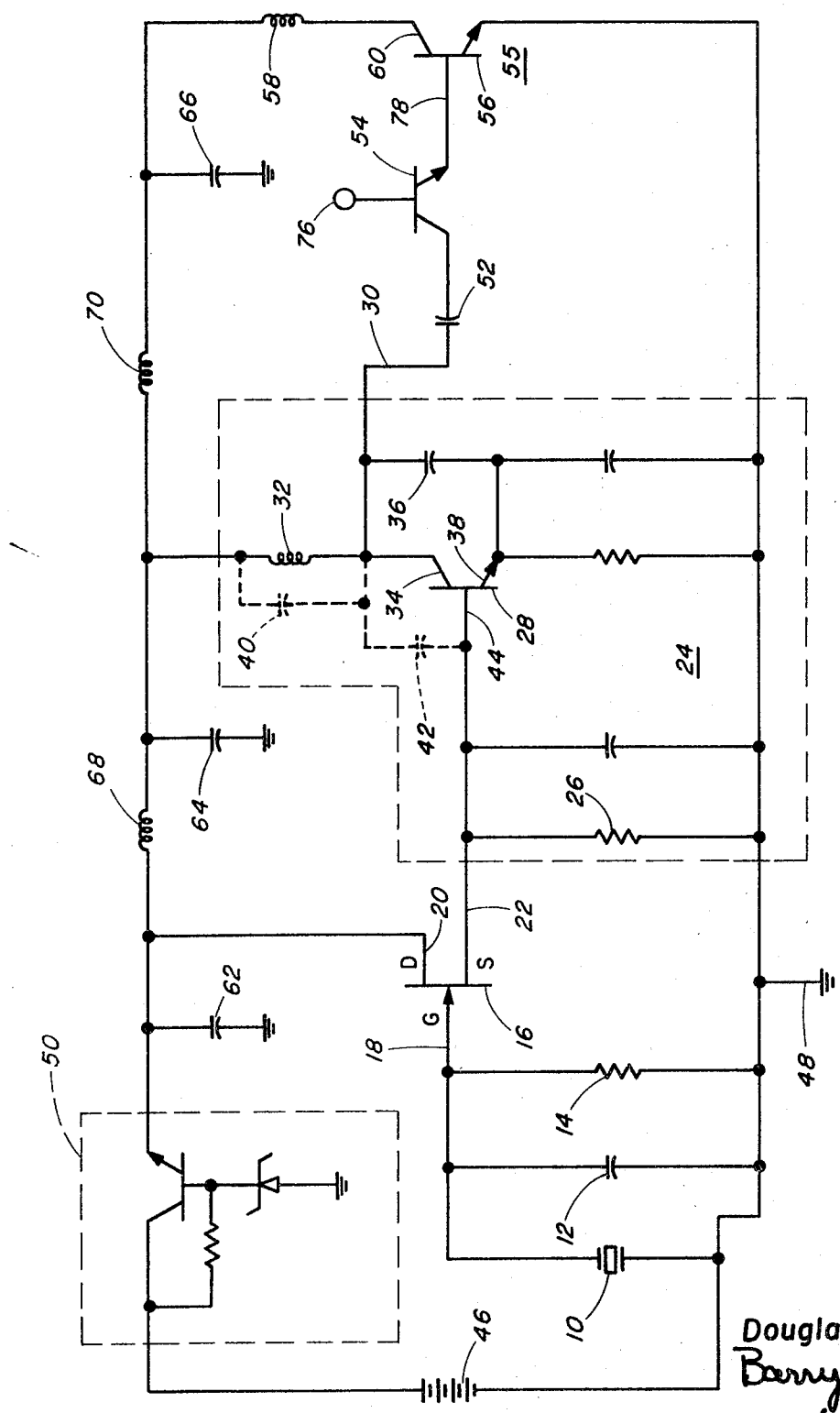
FIG. 1 is a circuit schematic view of the accelerometer monitoring device according to the present invention.

Referring now to the drawings wherein like reference numerals designate corresponding parts in the several views, and more particularly to FIG. 1 thereof, the acceleration monitoring device of the present invention is shown as including an accelerometer, such as, for example, a conventional piezoelectric transducer 10. Piezoelectric transducers are instruments for measuring acceleration wherein a crystalline body of semimetallic or semiconductive material is physically deformed by an amount proportional to the magnitude of the applied force, the material generating an electric charge proportional to the amount of deformation. The applied acceleration is measured in G units, one G being the value of acceleration of a free-falling body at the earth's surface.

An energy storage device, such as a capacitor 12, and a resistor 14 are parallel connected across accelerometer 10 to increase the time constant of the accelerometer and to bleed off any static charge on the accelerometer, respectively. The accelerometer output is coupled to an impedance matching device, such as, for example, a field-effect transistor 16 having gate, drain, and source terminals 18, 20, and 22, respectively. More particularly, the high output impedance of transducer 10 is matched to the high input impedance provided at the gate terminal 18 of field-effect transistor 16. Similarly, the field-effect transistor provides a somewhat low impedance at source terminal 22 to match the low input impedance of a signal generating source, such as an oscillator 24, connected thereto. Thus, field-effect transistor 16 matches the high impedance of piezoelectric accelerometer 10 to the low impedance of the oscillator 24.

Signal generating source 24 may be a frequency modulated oscillator, such as, for example, a conventional Colpitts oscillator shown in dashed line construction. As hereinafter explained, oscillator 24 is directly coupled to the piezoelectric transducer 10 via the field-effect transistor 16 and, therefore, provides a dc or quiescent acceleration response as well as a transient acceleration indication. More particularly, by directly coupling the piezoelectric transducer to the oscillator via the field-effect transistor, oscillator 24 is able to respond to quiescent as well as transient electrical signal provided by the transducer. Colpitts oscillator 24 includes a resistive impedance, such as resistor 26, and a semiconductive active element such as a transistor 28, which are connected to the source terminal 22 of the field-effect transistor. Resistor 26 serves to bias transistor 28 in its active region to provide oscillatory signals of a predetermined frequency at an output 30 when piezoelectric transducer 10 is sensing only nominal acceleration.

This nominal output frequency signal is dependent on the tuning of a tank circuit which includes an inductive impedance, such as an inductor 32, coupled to the collector 34 of the transistor and a capacitive impedance, such as a capacitor 36, one side of which is connected to the juncture of inductor 32 and collector 34 and the other side of which is connected to the emitter 38 of the transistor. The tank circuit also includes the inherent capacitance of inductor 32 shown as a parallel connected capacitor 40 in dashed line construction and the inherent capacitance of transistor 28 shown as a capacitor 42 in a dashed line construction connected between collector 34 and base 44 of the transistor. The bias current path for oscillator 24 may be traced as including a source energy, such as a dc power supply 46, drain terminal 20, source terminal 22, resistor 26, and a point of reference potential, such as ground 48. A conventional voltage regulator circuit 50 may be included in the power supply circuit to keep constant the output of battery 46.

As hereinafter more fully explained, when piezoelectric transducer 10 senses an accelerating force, it provides an electrical signal to gate terminal 18 which varies the current flow through drain 20 and source 22 of the field-effect transistor and, therefore, changes the magnitude of the biasing voltage at base electrode 44 of transistor 28. The inherent interelectrode capacitance 42 of transistor 28 is voltage dependent and, therefore, changes in value as the voltage applied to base 44 changes. Thus, the tuning of the tank circuit changes as the voltage applied to base 44 varies and, correspondingly, the frequency of the signal at oscillator output 30 also varies. It should be readily apparent, therefore, that the signal applied to gate 18, which is responsive to the acceleration sensed by piezoelectric transducer 10, frequency modulates oscillator 24 to provide an acceleration dependent ac frequency signal at the output 30 of the oscillator.

The oscillator output 30 is connected via a small dc blocking capacitor 52 and a semiconductive switch element, such as a transistor 54, to a Class C buffer amplifier 55 having a semiconductive active element such as transistor 56 normally biased to cut-off. As hereinafter more fully explained, the buffer amplifier isolates the oscillator 24 from the adverse effects of detuning prior to target impact. Buffer amplifier 55 is coupled to a radiating antenna shown schematically, for example, as a coil 58 located in the collector circuit 60 of transistor 56. The antenna transmits the frequency modulated signal which is proportional to the acceleration sensed by piezoelectric transducer 10 to a remotely located receiver (not shown) where the frequency modulated signal may be detected to provide an indication of sensed acceleration.

A plurality of grounded capacitors 62, 64 and 66 and a plurality of inductors 68 and 70 are connected to field-effect transistor 16, oscillator 24 and antenna 58 to isolate the latter mentioned stages from high frequency spurious signals or the like. Thus, the capacitors 62 – 66 and the inductors 68 and 70 form high frequency filters which isolate the individual stages from high frequency signals or the like.

The operation of the acceleration monitoring device of the present invention may be better understood by considering one embodiment wherein the device is located in an ordnance vehicle, which is approaching a target, at relatively high velocity, it being noted, of course, that the present invention may be utilized otherwise.

Figure 2:
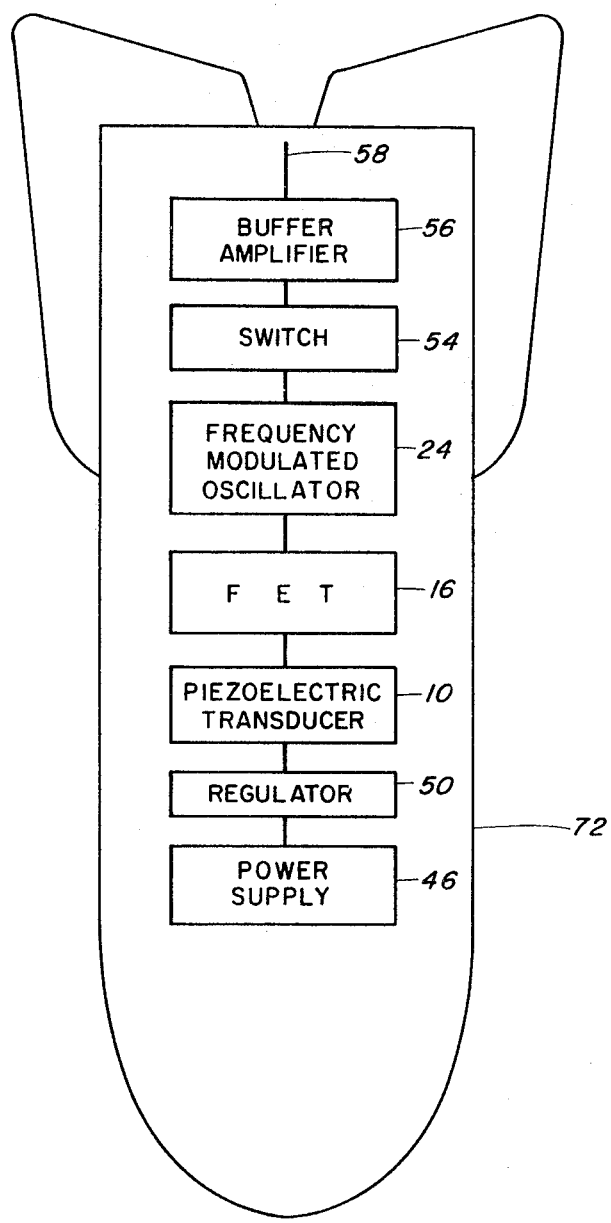
FIG. 2 is a schematic block diagrammatic view of the acceleration monitoring device shown in FIG. 1 as utilized in an ordnance vehicle.

Referring now to FIG. 2 of the drawing, the acceleration monitoring device according to the present invention is shown in block diagrammatic form as located in an ordnance device 72, such as, for example, a bomb or the like, approaching a target such as ground 74 with a relatively high velocity. As heretofore explained, the instant invention provides a frequency modulated signal at antenna 58 responsive to the acceleration of the ordnance vehicle despite the adverse effects on tuning which normally occur as the ordnance vehicle approaches the target surface 74. Assuming, initially, that the ordnance vehicle is approaching the target with a uniform velocity, piezoelectric transducer 10 will sense zero acceleration and the signal provided at the output 30 of oscillator 24 and, therefore, radiated by antenna 58, will be of a predetermined frequency. As the velocity changes, piezoelectric transducer 10 senses the change in the velocity to provide an electrical signal at gate 18 of field-effect transistor 16. The electrical signal applied to the gate may be a transient signal, such as a pulse edge or the like which changes the current flow through the field-effect transistor and, therefore, changes the bias voltage provided at base 44 of the oscillator. The changed biasing voltage will affect the voltage dependent capacitor 42 connected across the collector base junction which, in turn, changes the tuning of the oscillator tank circuit to vary the frequency of the oscillator output at lead 30. Thereafter, the acceleration responsive electrical signal may reach a quiescent value and, in contrast to previously employed monitoring devices, the electrical signal change the oscillator frequency to a value corresponding to the quiescent acceleration signal. Thus, the frequency of the signal transmitted by antenna 58 will change dependent on the sensed acceleration, whether quiescent or transient, and this frequency modulated signal may be detected to provide an indication of the acceleration of the ordnance vehicle.

It may be desired to sample the acceleration as a function of an independent variable such as, for example, temperature or the like. To facilitate this, transistor switch 54 is connected between the frequency modulated oscillator 24 and the buffer amplifier 56 to control the operation of the buffer amplifier. More particularly, when transistor 54 is conductive, transistor 56 will be turned ON to drive coil 58 and, therefore, transmit the frequency modulated acceleration signal to a remote receiver. If, however, transistor 54 is nonconductive, buffer amplifier 56 is turned OFF, and, therefore, no signal will be transmitted to the remote receiver by antenna 58. Thus, by controlling conduction of transistor 54 such as, for example, by applying an independent signal which may be connectable to the base 76 of transistor 54, the acceleration monitoring device may be pulsed ON or OFF to provide a sampling of acceleration. It should be noted that buffer amplifier 56, operating as a Class C amplifier, does not consume any power and, therefore, does not drive antenna 58 until it is rendered conductive by a signal applied to its base 78. Thus, the Class C buffer amplifier is a highly efficiency component which draws no power in its OFF mode of operation.

As hereinbefore explained, heretofore employed conventional acceleration monitoring devices are adversely affected by detuning as the device approaches an impact surface or the like. This is due, in part, to changing capacitances of the radiating antenna which cause changes in the oscillator frequency prior to impact. These frequency changes, caused by detuning, mask the frequency modulation response of the oscillator, and, therefore, a proper indication of acceleration is not available. By inserting buffer amplifier 56 intermediate the antenna 58 and the oscillator 24, the adverse effects of detuning or the like may be eliminated. More particularly, buffer amplifier 56 allows the frequency modulated oscillator to be physically and electrically shielded from the detuning effects caused by the changing capacitance of the antenna 58 prior to target impact. The changing capacitance of the antenna 58 does affect the buffer amplifier but, since the buffer amplifier is operated in its Class C mode of operation, the detuning causes only changes in the amplitude of buffer amplifier. Since the signal at the output of the buffer amplifier is a frequency modulated signal, that is, is proportional in frequency to the sensed acceleration, changes in amplitude of the buffer amplifier will not adversely affect the acceleration responsive signal received by a remotely located receiver. Thus, by using a Class C buffer amplifier, it is readily apparent that the defects of the detuning prior to target impact may be minimized or otherwise eliminated.

As hereinbefore explained, the acceleration monitoring device of the present invention provides an indication of dc or quiescent acceleration as well as transient acceleration sensed by piezoelectric transducer 10. More particularly, by increasing the time constant of piezoelectric transducer 10 by inserting a parallel connected capacitor 12 and by directly coupling the field-effect transistor 16 to the frequency modulated oscillator 24 without an intermediate capacitor or the like connected therebetween, the frequency modulated output at lead 30 responds to both quiescent as well as transient acceleration signals sensed by the piezoelectric transducer. Thus, the acceleration monitoring device responds to the full frequency range of signals provided by piezoelectric transducer 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An acceleration monitoring device comprising:
   piezoelectric transducer means for sensing acceleration and for producing a signal responsive thereto,
   means for providing an oscillatory signal of a predetermined frequency,
   field effect transistor means intermediate said piezoelectric transducer means and said oscillatory signal means for varying the predetermined frequency proportional to the acceleration responsive signal so as to provide both a quiescent and a transient acceleration response,
   means for transmitting said oscillatory signal to a point remotely located from said acceleration monitoring device, and means intermediate said transmitting means and said oscillatory signal means for isolating said oscillatory signal means from the effects of detuning.

2. An acceleration monitoring device according to claim 1 wherein
said means for isolating said oscillatory signal means and said transmitting means is a buffer amplifier.

3. An acceleration monitoring device according to claim 2 further comprising switch means connected to said buffer amplifier for controlling the operation of said amplifier independent of said acceleration sensing means.

4. An acceleration monitoring device according to claim 2 wherein
said acceleration monitoring device is located within an ordnance vehicle.

* * * * *